United States Patent
Moon et al.

(10) Patent No.: US 11,314,263 B2
(45) Date of Patent: Apr. 26, 2022

(54) ROBOT SYSTEM AND CONTROL METHOD OF THE SAME

(71) Applicant: LG ELECTRONICS INC., Seoul (KR)

(72) Inventors: Sungmin Moon, Seoul (KR); Nakyeong Kim, Seoul (KR); Sanghak Lee, Seoul (KR); Jeongkyo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 16/657,460

(22) Filed: Oct. 18, 2019

(65) Prior Publication Data

US 2020/0047627 A1 Feb. 13, 2020

(30) Foreign Application Priority Data

Sep. 19, 2019 (KR) ........................ 10-2019-0115408

(51) Int. Cl.
| | | |
|---|---|---|
| *G05D 1/02* | (2020.01) | |
| *B60L 15/20* | (2006.01) | |
| *B25J 5/00* | (2006.01) | |
| *G05D 1/00* | (2006.01) | |

(52) U.S. Cl.
CPC ............ *G05D 1/0223* (2013.01); *B25J 5/007* (2013.01); *B60L 15/20* (2013.01); *G05D 1/0066* (2013.01); *G05D 1/0227* (2013.01); *B60W 2520/28* (2013.01); *B60W 2720/28* (2013.01)

(58) Field of Classification Search
CPC .. G05D 1/0066; G05D 1/0223; G05D 1/0225; G05D 1/0227; G05D 1/0272; G05D 2201/02; G05D 2201/0203; G05D 2201/0206; G05D 2201/0207; G05D 2201/0209–0216; B60L 15/20; B60W 2520/28; B60W 2720/28; B25J 5/007
See application file for complete search history.

(56) References Cited

U.S. PATENT DOCUMENTS

2007/0271004 A1 11/2007 Kim

FOREIGN PATENT DOCUMENTS

| KR | 10-0664061 B1 | 1/2007 |
| KR | 10-0827235 B1 | 5/2008 |
| KR | 20-0446075 Y1 | 9/2009 |

OTHER PUBLICATIONS

Hirota et al., "Development of an escalator riding robot: Experiment of riding on an up escalator," Aug. 2014, 2014 IEEE International Conference on Automation Science and Engineering (CASE), pp. 1206-1211 (Year: 2014).*
Yeo et al., "Riding on Moving Escalator of Humanoid Robot using 3D-Space Recognition Algorithm with Single Camera," Oct. 2007, International Conference on Control, Automation and System 2007, pp. 1107-1111 (Year: 2007).*

* cited by examiner

*Primary Examiner* — Spencer D Patton
(74) *Attorney, Agent, or Firm* — Birch, Stewart, Kolasch & Birch, LLP (57) ABSTRACT

A robot system includes a mobile robot provided with a driving wheel and a driving motor, a load cell provided in the mobile robot, a spring connected to the load cell, an auxiliary wheel connected to the spring, and a controller configured to change a speed of the driving motor according to a sensing value of the load cell.

12 Claims, 9 Drawing Sheets

ROBOT SYSTEM AND CONTROL METHOD OF THE SAME

CROSS-REFERENCE TO RELATED APPLICATIONS

This application claims the benefit of priority to Korean Patent Application No. 10-2019-0115408, filed in the Korean Intellectual Property Office on Sep. 19, 2019, the entire contents of which are incorporated herein by reference.

FIELD OF THE DISCLOSURE

The present disclosure relates to a robot system and a control method of the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

SUMMARY

An object of the present invention is to provide a robot system capable of stably and smoothly seating a mobile robot, and a method of controlling the same.

Another object of the present invention is to provide a robot system capable of calculating a speed difference between a mobile robot and a moving walkway using a simple structure, and a method of controlling the same.

According to an embodiment, a robot system may include a mobile robot provided with a driving wheel and a driving motor, a load cell provided in the mobile robot, a spring connected to the load cell, an auxiliary wheel connected to the spring, and a controller configured to change a speed of the driving motor according to a sensing value of the load cell.

The robot system may further include a cylinder connected to the mobile robot and having formed therein a space in which the spring is received.

The cylinder may be provided to protrude from a bottom of the mobile robot.

The auxiliary wheel may include a wheel, and a wheel connector, to which the wheel is rotatably connected, and a space in which a portion of the spring is received may be formed in the wheel connector.

A portion of the wheel connector may be inserted into the cylinder or a portion of the cylinder may be inserted into the wheel connector.

A robot system may include a mobile robot provided with a driving wheel and a driving motor, an auxiliary wheel, an auxiliary wheel sensor installed in the mobile robot and connected with the auxiliary wheel to sense a movement speed of the auxiliary wheel.

The driving motor may be accelerated if the movement speed of the auxiliary wheel is higher than a movement speed of the mobile robot after the auxiliary wheel enters a moving walkway.

The driving motor may be decelerated if the movement speed of the auxiliary wheel is lower than the movement speed of the mobile robot after the auxiliary wheel enters the moving walkway.

The auxiliary wheel sensor may include a load cell provided in the mobile robot and a spring connected to the load cell and the auxiliary wheel. The controller may change a speed of the driving motor according to a sensing value of the load cell.

The controller may accelerate the driving motor if a length of the spring increases, and the controller may decelerate the driving motor if the driving wheel enters a moving walkway.

The controller may decelerate the driving motor if a length of the spring decreases.

The controller may decelerate the driving motor at a first acceleration if a length of the spring decreases and decelerate the driving motor at a second acceleration if the driving wheel enters a moving walkway. The second acceleration may be less than the first acceleration.

A method of controlling a robot system may control a mobile robot provided with a driving wheel and a driving motor.

The method may include sensing a movement speed of an auxiliary wheel by an auxiliary wheel sensor installed in the mobile robot, performing a speed changing process of accelerating the driving motor if a movement speed of the auxiliary wheel is higher than a movement speed of the mobile robot after the auxiliary wheel enters a moving walkway and decelerating the driving motor if the movement speed of the auxiliary wheel is lower than the movement speed of the mobile robot after the auxiliary wheel enters the moving walkway.

The performing of the speed changing process may include stopping the driving motor if the driving wheel enters the moving walkway after accelerating the driving motor.

The performing of the speed changing process may include stopping the driving motor if the driving wheel enters the moving walkway after decelerating the driving motor.

DETAILED DESCRIPTION OF THE PREFERRED EMBODIMENTS

DETAILED DESCRIPTION OF THE PREFERRED EMBODIMENTS

Hereinafter, preferred embodiments of the present invention will be described in detail with reference to the drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user. For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Figure 1:
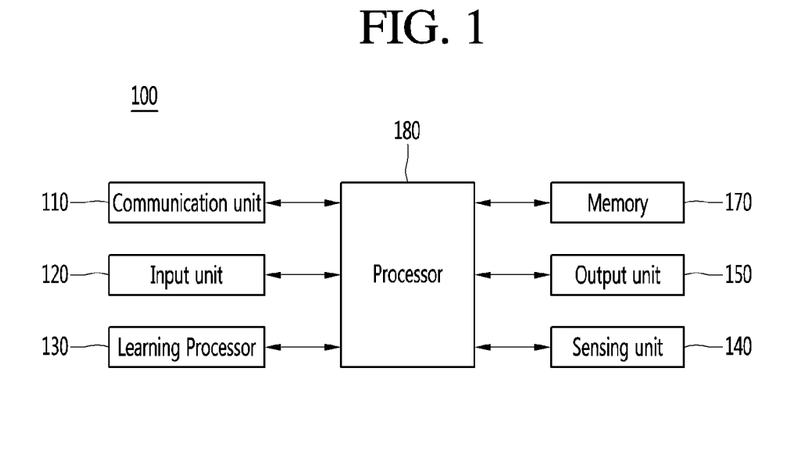
FIG. 1 is a view illustrating an AI device constituting a robot system according to an embodiment.

FIG. 1 is a view illustrating an AI device constituting a robot system according to an embodiment.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data. The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation. At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information. The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation. When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
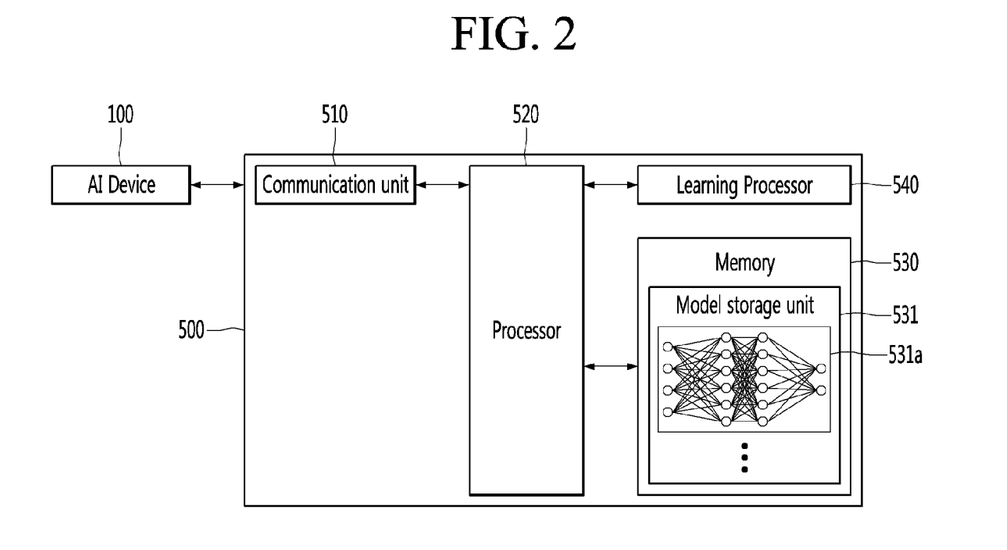
FIG. 2 is a view illustrating an AI server of a robot system according to an embodiment.

FIG. 2 is a view illustrating an AI server of a robot system according to an embodiment. Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 520, and the like.

The communication unit 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
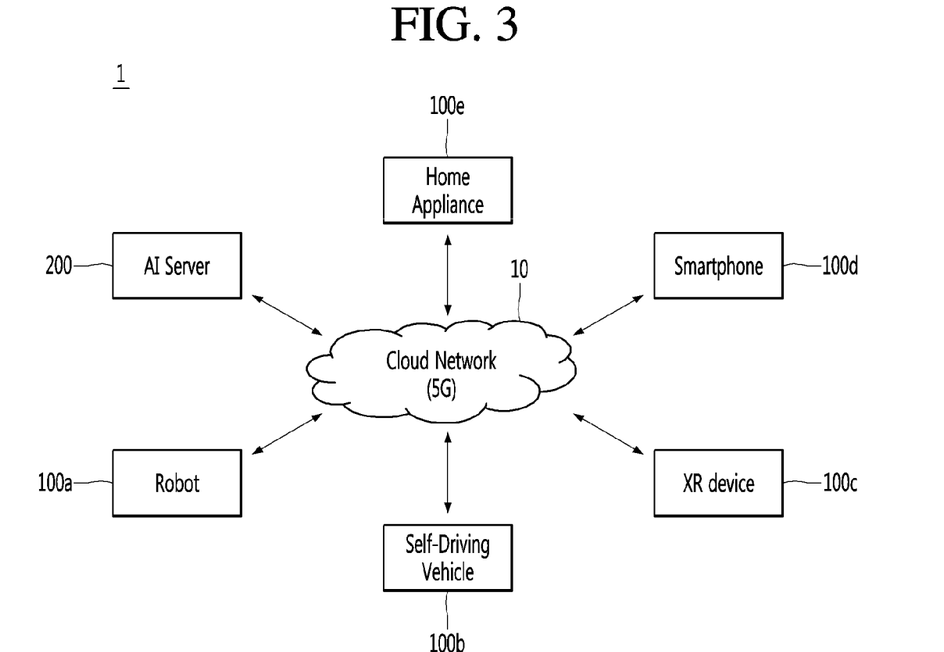
FIG. 3 is a view illustrating an AI system to which a robot system according to an embodiment is applied.

FIG. 3 is a view illustrating an AI system to which a robot system according to an embodiment is applied.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 500 configuring the AI system 1 may be connected to each other through the cloud network 10. In particular, each of the devices 100*a* to 100*e* and 500 may communicate with each other through a base station, but may directly communicate with each other without using a base station. The AI server 500 may include a server that performs AI processing and a server that performs operations on big data.

The AI server 500 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 500 may learn the artificial neural network according to the machine learning algorithm instead of the AI devices 100*a* to 100*e*, and may directly store the learning model or transmit the learning model to the AI devices 100*a* to 100*e*.

At this time, the AI server 500 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 500.

At this time, the robot 100*a* may perform the operation by generating the result by directly using the learning model, but the sensor information may be transmitted to the external device such as the AI server 500 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

Figure 4:
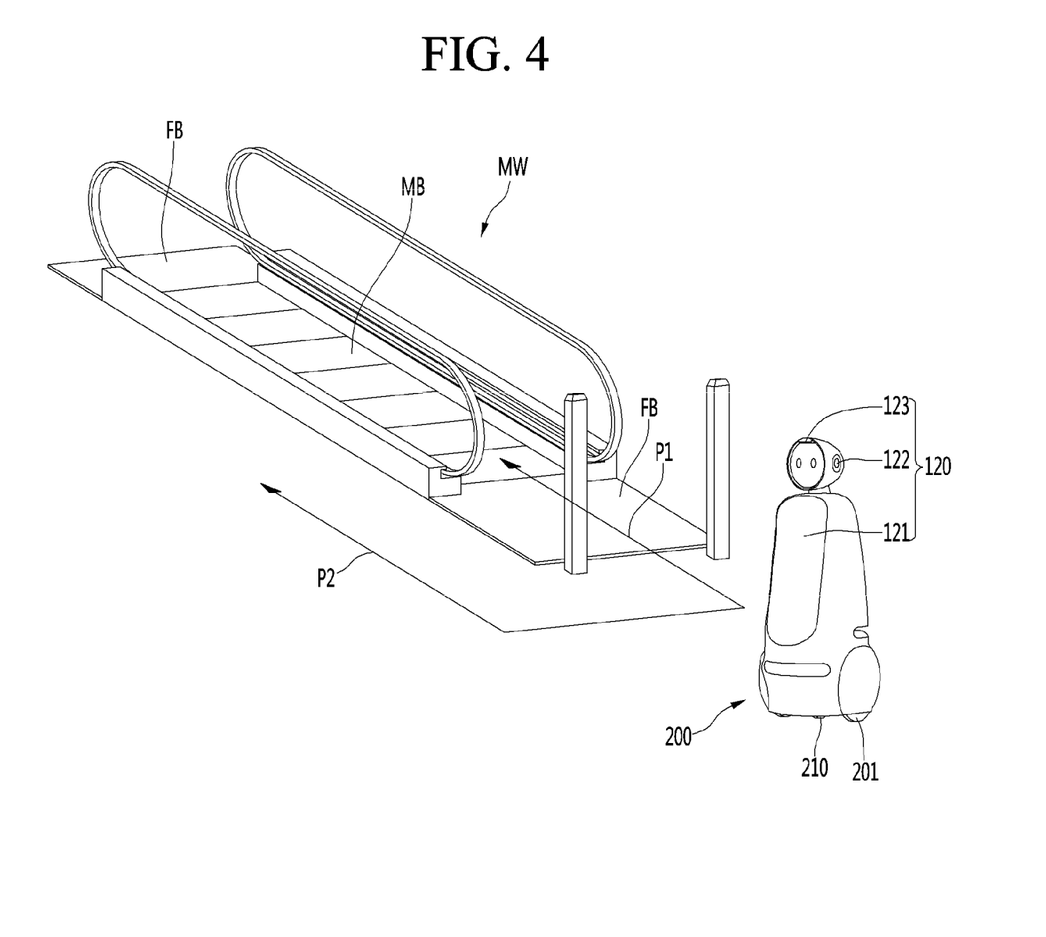
FIG. 4 is a view showing a traveling path of a robot according to an embodiment.
Figure 5:
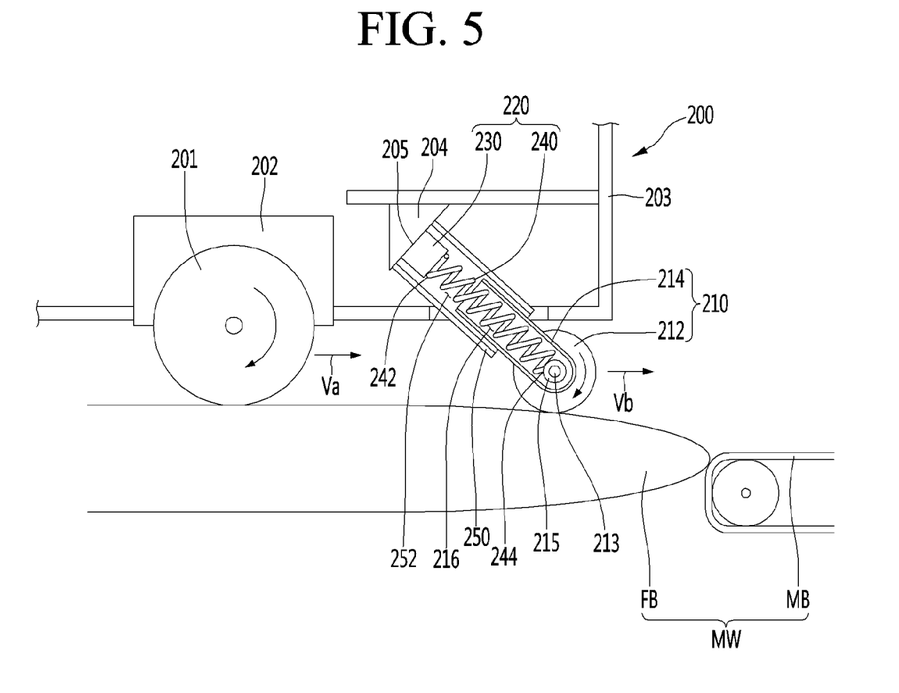
FIG. 5 is a side view when an auxiliary wheel of a robot according to an embodiment enters a moving walkway.
Figure 6:
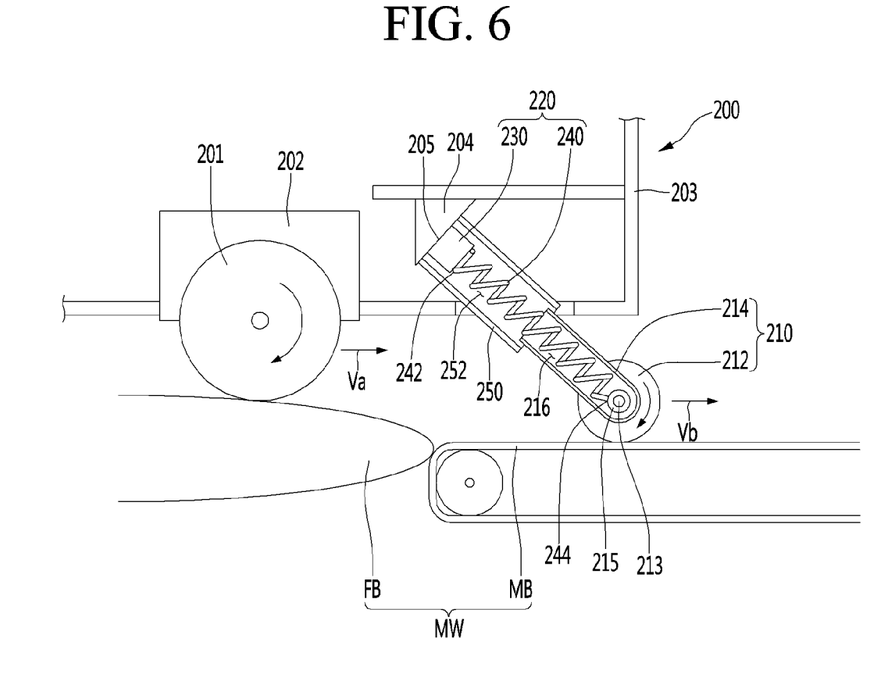
FIG. 6 is a side view at the time of movement along the moving walkway after the auxiliary wheel shown in FIG. 5 enters the moving walkway.
Figure 7:
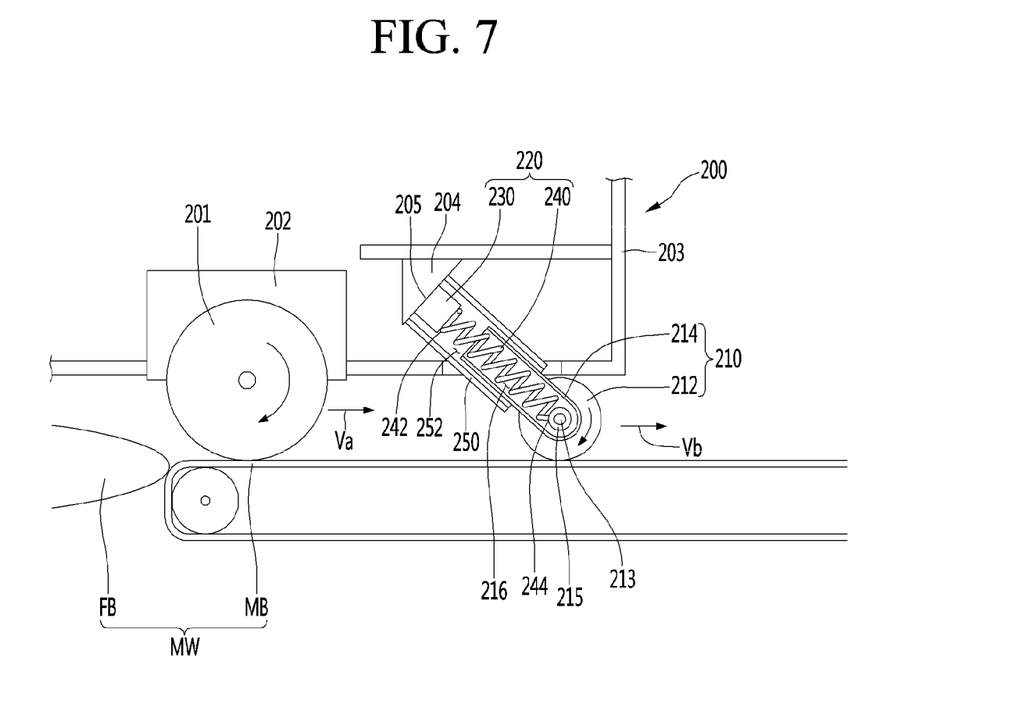
FIG. 7 is a side view at the time of movement along the moving walkway along with the auxiliary wheel after the auxiliary wheel shown in FIG. 6 enters the moving walkway.

FIG. 4 is a view showing a traveling path of a robot according to an embodiment, FIG. 5 is a side view when an auxiliary wheel of a robot according to an embodiment enters a moving walkway, FIG. 6 is a side view at the time of movement along the moving walkway after the auxiliary wheel shown in FIG. 5 enters the moving walkway, and FIG. 7 is a side view at the time of movement along the moving walkway along with the auxiliary wheel after the auxiliary wheel shown in FIG. 6 enters the moving walkway.

The robot 100*a* may include a mobile robot 200 provided with a driving wheel 201 and a driving motor 202.

The mobile robot 200 may include a driving mechanism connected to the driving wheel 201 to rotate the driving wheel, and the driving mechanism may include the driving motor 202.

In the driving mechanism, the rotation shaft of the driving motor 202 may be directly connected to the driving wheel 201, such that the rotation shaft of the driving motor 202 rotates the driving wheel 201 forward or backward.

The driving mechanism may further include a power transmission member such as a gear for transmitting driving force of the driving motor 202 to the driving wheel 201. When the driving motor 202 is driven, the driving wheel 201 may be rotated forward or backward by the power transmission member.

The mobile robot 200 may travel along a traveling path. When the driving motor 202 is driven, the driving wheel 201 may be rotated forward or backward and the mobile robot 200 may be moved forward or backward.

The mobile robot 200 may include a steering mechanism for changing a movement direction to the left or right and the mobile robot 200 may travel while turn left or right along the traveling path.

The robot 100*a* may be a robot having a self-driving function. The robot 100*a* may be used in an airport, a government office, a hotel, a mart, a department store, etc. and may be a guidance robot for providing a variety of information to a user, a porter robot for carrying user's goods, or a boarding robot in which a user directly rides.

The robot 100*a* may move to a destination along with the user and guide a user to a destination.

When the destination is determined by the user, etc., the robot 100*a* may travel along traveling paths P1 and P2 to the destination.

The robot 100*a* may move along a traveling path selected from the plurality of traveling paths P1 and P2 along which the mobile robot 200 may move.

The plurality of traveling paths P1 and P2 may include a traveling path having a shortest time from a starting point to the destination and a traveling path having a shortest distance from the starting point to the destination.

Each of the plurality of traveling paths P1 and P2 may include at least one waypoint through which the mobile robot 200 departing from the starting point passes before reaching the destination.

The plurality of traveling paths P1 and P2 may be classified depending on whether a moving walkway MW is included.

The moving walkway MW may include a pair of fixed bodies FB spaced apart from each other in the longitudinal direction of the moving walkway MW, and a moving body MB moving in the longitudinal direction of the moving walkway MW. The height of the upper surface of the moving body MB may be lower than that of the fixed body FB.

The user or the robot 100*a* may be moved to the moving body MB on any one of the pair of fixed bodies FB, and may be moved to the other of the pair of fixed bodies FB on the moving body MB.

The plurality of traveling paths P1 and P2 may include a first traveling path P1 including a moving walkway and at least one second traveling path P2 which does not include a moving walkway.

The robot 100*a* may include a user interface, via which the user may input various commands or information.

The user interface may be installed in the mobile robot 200, the user interface may configure the robot 100*a* along with the mobile robot 200, and the user may approach the mobile robot 200 to input various commands or information via the user interface.

Hereinafter, it is assumed that the user interface is an input unit 120 installed in the mobile robot 200, and, for convenience of description, is denoted by the same reference numeral as the input unit 120. However, the user interface of the present embodiment is not limited to the input unit 120 installed in the mobile robot 200.

An example of the user interface 102 may include a touch interface 121 such as a touchscreen for allowing the user to perform touch input. The touch interface 121 may transmit touch input to a controller when touch of the user is sensed.

Another example of the user interface 120 may include a microphone 122 capable of receiving speech of the user. The microphone 122 may configure a speech recognition module including a speech recognition circuit and transmit a command or information recognized by the speech recognition module to the controller.

Another example of the user interface 120 may include a sensor for sensing an object (e.g., an identification card, etc.) possessed by the user. Such a sensor may include a scanner 123.

The scanner 123 may scan the identification (ID) card such as a passport possessed by the user.

The ID card capable of being sensed by the scanner 123 is not limited to the ID card such as the passport, and may include a card via which the user is authorized to use the mobile robot 200. The type of the ID card is not limited if the user information such as user's age, baggage information and a health level is stored.

The robot 100*a* may further include an auxiliary wheel 210 assisting traveling of the mobile robot 200.

The auxiliary wheel 210 is not connected with a driving source such as a motor and may be rotated according to movement of the mobile robot 200 when the mobile robot 200 moves by the driving wheel 201.

An example of the auxiliary wheel 210 may be a caster disposed below the mobile robot 200. However, the auxiliary wheel 210 is not limited to the caster and the type thereof is not limited if the auxiliary wheel may guide movement of the mobile robot 200 while supporting the load of the mobile robot 200.

The auxiliary wheel 210 may be disposed in front of the driving wheel 201, and a distance between the front end of the mobile robot 200 and the auxiliary wheel 210 may be less than the front end of the mobile robot 200 and the driving wheel 201. In this case, the auxiliary wheel 210 may be a front guide wheel and the driving wheel 201 may be a rear driving wheel.

The robot 100a may include an auxiliary wheel sensor 220 capable of sensing the movement speed of the auxiliary wheel 210 when the mobile robot 200 travels. The auxiliary wheel sensor 220 may be installed in the mobile robot 200 and connected with the auxiliary wheel 210.

The auxiliary wheel sensor 220 may sense a speed at which the auxiliary wheel 210 moves in a straight line.

The robot 100a may include a load cell 230 provided in the mobile robot 200 and a spring 240 connected to the load cell 220.

The robot 100a may include a robot body 203 supporting various parts mounted in the mobile robot 200. The robot body 203 may be provided with a load cell mounter 204 in which the load cell 230 is mounted. The load cell mounter 204 may include a load cell seating surface 205 on which the load cell 230 is seated. The load cell seating surface 205 may be formed to be inclined to the front lower side.

The spring 240 may be connected to the load cell 230 and the auxiliary wheel 210, and may be disposed between the load cell 230 and the auxiliary wheel 210. The spring 240 may be compressed or extended according to the distance between the load cell 230 and the auxiliary wheel 210.

The load cell 230 and the spring 240 may configure the auxiliary wheel sensor 220. An assembly of the load cell 230 and the spring 240 may be an example of the auxiliary wheel sensor 220.

Another example of the auxiliary wheel sensor 220 may include an optical sensor and the type thereof is not limited if the movement speed of the auxiliary wheel 210 may be sensed.

Hereinafter, it is assumed that the auxiliary wheel sensor 220 includes the load cell 230 and the spring 240.

The auxiliary wheel 210 may be connected to the mobile robot 200 via the auxiliary wheel sensor 220.

The robot 100a may further include a cylinder 250 connected to the mobile robot 200. The cylinder 250 may be provided to protrude from the bottom of the mobile robot 200. In the cylinder 250, a space 252 in which the spring 240 is received may be formed.

The auxiliary wheel 210 may include a wheel 212 and a wheel connector 214, to which the wheel 212 is rotatably connected.

The rotation shaft 213 of the wheel 212 may be rotatably supported by a shaft support body 215 formed in the wheel connector 214. The wheel 212 may rotate about the shaft support body 215.

In the wheel connector 214, a space 216 in which a portion of the spring 240 is received may be formed.

The wheel connector 214 may have a hollow cylindrical shape with the space 126 formed therein, and the shaft support body 215 may be formed integrally with the wheel connector 214.

The wheel connector 214 may be disposed such that a portion thereof is inserted into the cylinder 250 or a portion of the cylinder 250 inserted into the wheel connector.

Spaces 216 and 252 in which the spring 240 is received may be formed in the cylinder 250 and the wheel connector 214, respectively.

The cylinder 250 may move integrally with the mobile robot 200 and the wheel connector 214 may move integrally with the wheel 212.

The wheel connector 214 may be spaced apart from the load cell 230, and the distance between the wheel connector 214 and the load cell 230 may be determined by the location of the wheel 212.

The spring 240 may have one end 242 connected to the connector 242 and the other end 244 connected to the load cell 230. The other end 244 of the spring 240 may be connected to the shaft support body 215.

An example of the spring 240 may be a coil spring.

The length of the spring 240 may be defined as a straight-line distance from one end 242 to the other end 244.

The spring 240 may be extended when the distance between the shaft support body 215 and the load cell 230 increases and may be compressed when the difference between the shaft support body 215 and the load cell 230 decreases.

The robot 100a may be controlled by the controller.

An example of the controller may include a processor 180 installed in the mobile robot 200 to control the mobile robot 200 and, more particularly, the driving motor 202.

Another example of the controller may include a processor of the various devices (e.g., the terminal such as the smartphone 100d, the computing device such as a desktop, a laptop, a tablet PC, etc.).

Another example of the controller may be a server 500.

When the controller is installed in the mobile robot 200, the controller may configure the robot 100a along with the mobile robot 200.

Hereinafter, it is assumed that the controller includes a processor installed in the mobile robot 200, for example. For convenience, the controller is denoted by the same reference numeral as the processor 180. However, the controller of the present embodiment is not limited to the processor 180 installed in the mobile robot 200.

The controller may control the driving motor 202, and control the driving motor 202 such that the movement speed of the driving motor 202 is changed.

The controller 180 may change the speed of the driving motor 202 according to the sensing value of the auxiliary wheel sensor 220 and, more particularly, the load cell 230.

When the mobile robot 200 travels, the auxiliary wheel 210 may enter the moving walkway MW earlier than the driving wheel 201, and the auxiliary wheel 210 may move along the moving walkway MW after entering the moving walkway MW.

"Entering the moving walkway MW" described in this specification may be defined as "being laid on the moving body MB of the moving walkway MW.

The auxiliary wheel 210 entering the moving walkway may mean a state in which the auxiliary wheel 210 is laid on the upper surface of the moving body MB, and the driving wheel 201 entering the moving walkway may mean a state in which the driving wheel 201 is laid on the upper surface of the moving body MB.

Meanwhile, the mobile robot 200 entering the moving walkway may mean a state in which the auxiliary wheel 210 of the mobile robot 200 is laid on the upper surface of the moving body MB.

The mobile robot 200 may enter the moving walkway MW at a higher or lower moving speed than the moving walkway MW.

The "movement speed of the moving walkway MW" described in this specification may be defined as a speed at which the moving body MB moves in a straight line between the pair of fixed bodies FB.

In addition, the movement speed of the mobile robot 200 may be substantially determined by the movement speed Va of the driving wheel 201. Hereinafter, it is assumed that the movement speed of the mobile robot 200 and the movement speed of the driving wheel 201 are the same.

When a difference between the speeds of the auxiliary wheel 210 and the driving wheel 201 is large after the auxiliary wheel 210 enters the moving walkway MW, the controller 180 may accelerate or decelerate the driving motor 202 as compared to before entering the moving walkway.

When the movement speed Vb of the auxiliary wheel 210 is higher than the movement speed Va of the mobile robot 200 after the auxiliary wheel 210 enters the moving walkway MW, the controller 180 may accelerate the driving motor 202.

When the movement speed of the moving walkway MW is higher than that of the mobile robot 200, the auxiliary wheel 210 may move at a higher speed than the mobile robot 200 when moving along the moving body MB of the moving walkway MW after entering the moving walkway MW. In this case, the spring 240 connected to the auxiliary wheel 210 may be extended by the speed difference and the length of the spring 240 may further increase as compared to before entering the moving walkway MW.

When the length of the spring 240 increases, the movement speed of the auxiliary wheel 210 is higher than the movement speed of the mobile robot 200 and the controller 180 may control the driving motor 202 such that the movement speed Va of the mobile robot 200 is similar or equal to the movement speed Vb of the auxiliary wheel 210. To this end, the controller 180 may accelerate the driving motor 202 as compared to before the auxiliary wheel 210 enters the moving walkway MW.

Meanwhile, when the driving wheel 201 enters the moving walkway MW, the controller 180 may decelerate the driving motor 202 and stop the driving motor 202.

When the movement speed Vb of the auxiliary wheel 210 is lower than the movement speed Va of the mobile robot 200 after the auxiliary wheel 210 enters the moving walkway MW, the controller 180 may decelerate the driving motor 202.

When the moving speed of the moving walkway MW is lower than the movement speed Va of the mobile robot 200, the auxiliary wheel 210 may move at a lower speed Vb than the mobile robot 200 after entering the moving walkway MW. In this case, the spring connected to the auxiliary wheel 210 may be compressed by such a speed difference and the length of the spring 240 may further decrease as compared to before entering the moving walkway.

When the length of the spring 240 decreases, the movement speed Vb of the auxiliary wheel 210 is lower than the movement speed Va of the mobile robot 200 and thus the controller 180 may control the driving motor 202 such that the movement speed of the mobile robot 200 is similar or equal to the movement speed of the auxiliary wheel 210. To this end, the controller 180 may decelerate the driving motor 202 as compared to before the auxiliary wheel 210 enters the moving walkway MW.

When the length L of the spring 240 decreases, the controller 180 may decelerate the driving motor 202 stepwise. When the length L of the spring 240 decreases, the controller 180 may decelerate the driving motor 202 at a first acceleration, and, when the driving wheel 201 enters the moving walkway MW, the controller 180 may decelerate the driving motor 202 at a second acceleration and stop the driving motor 202.

The second acceleration may be less than the first acceleration.

The mobile robot 200 may be rapidly decelerated at a negative first acceleration when the length L of the spring 240 decreases, may be slowly decelerated at a negative second acceleration when the driving wheel 201 enters the moving walkway MW, and may be stopped on the moving walkway MW as time elapses.

Figure 8:
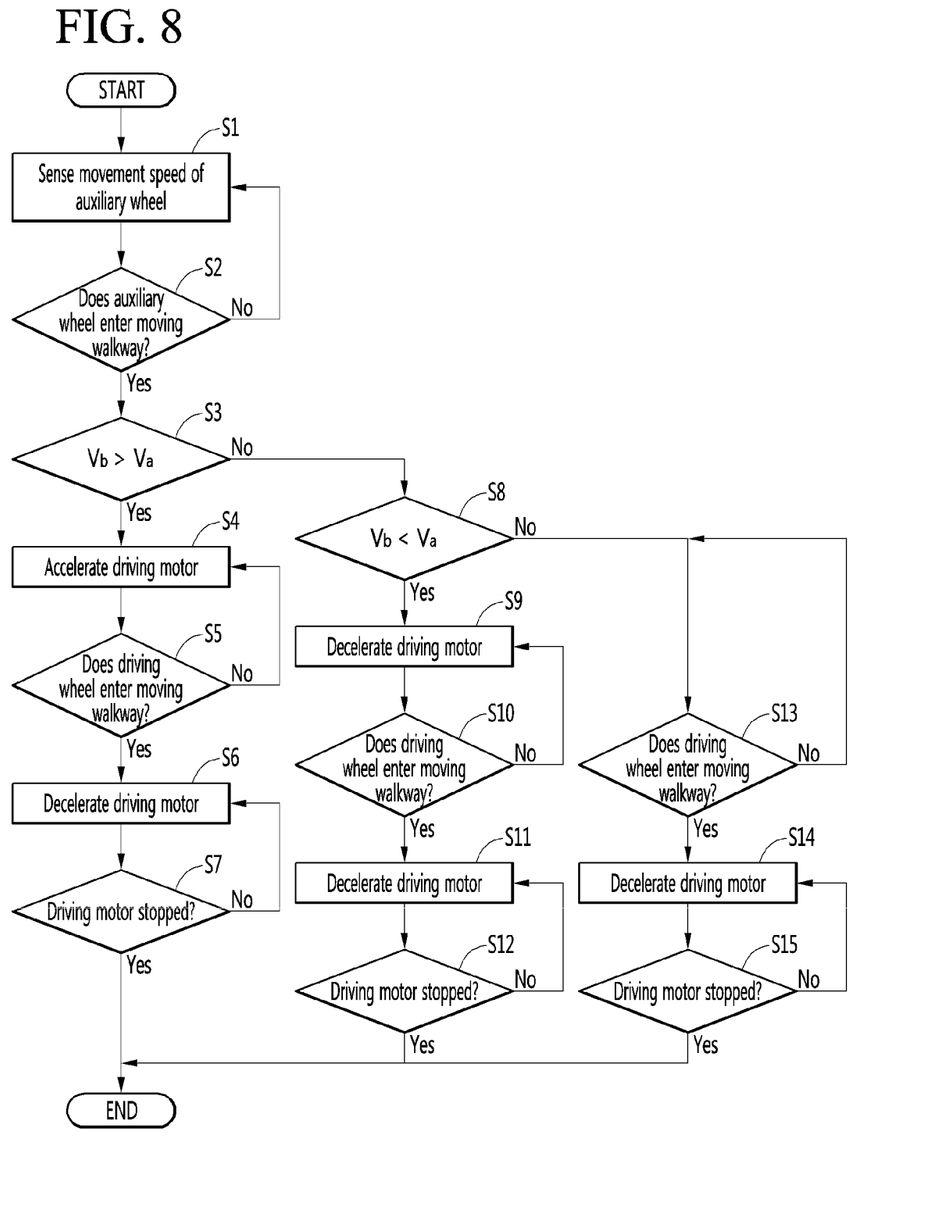
FIG. 8 is a flowchart illustrating a method of controlling a robot system according to an embodiment.

FIG. 8 is a flowchart illustrating a method of controlling a robot system according to an embodiment.

Figure 9:
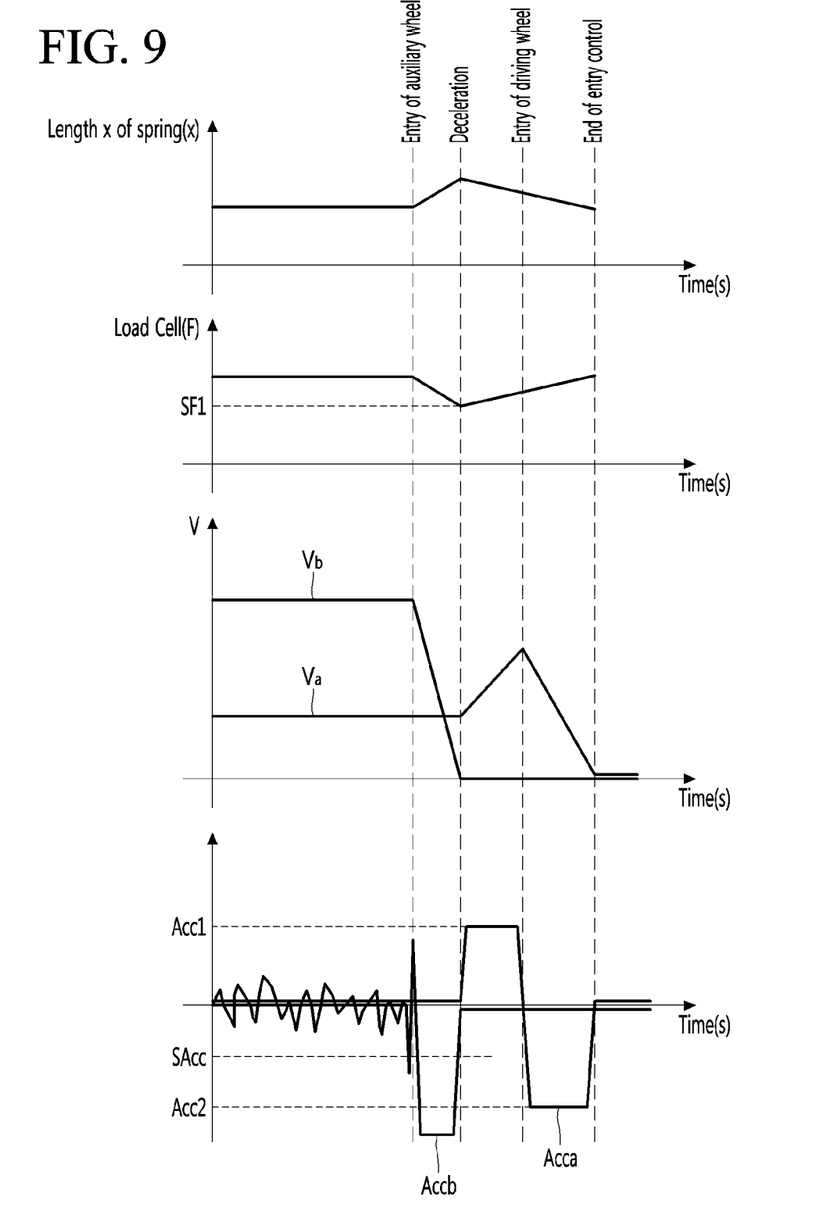
FIG. 9 is a view showing change in spring length, change in force measured by a load cell, change in movement speed of an auxiliary wheel, change in movement speed of a driving wheel, change in acceleration of the auxiliary wheel and change in acceleration of the driving wheel, when the movement speed of a moving walkway is greater than the movement speed of a mobile robot according to an embodiment.

FIG. 9 is a view showing change in spring length, change in force measured by a load cell, change in movement speed of an auxiliary wheel, change in movement speed of a driving wheel, change in acceleration of the auxiliary wheel and change in acceleration of the driving wheel, when the movement speed of a moving walkway is greater than the movement speed of a mobile robot according to an embodiment.

Figure 10:
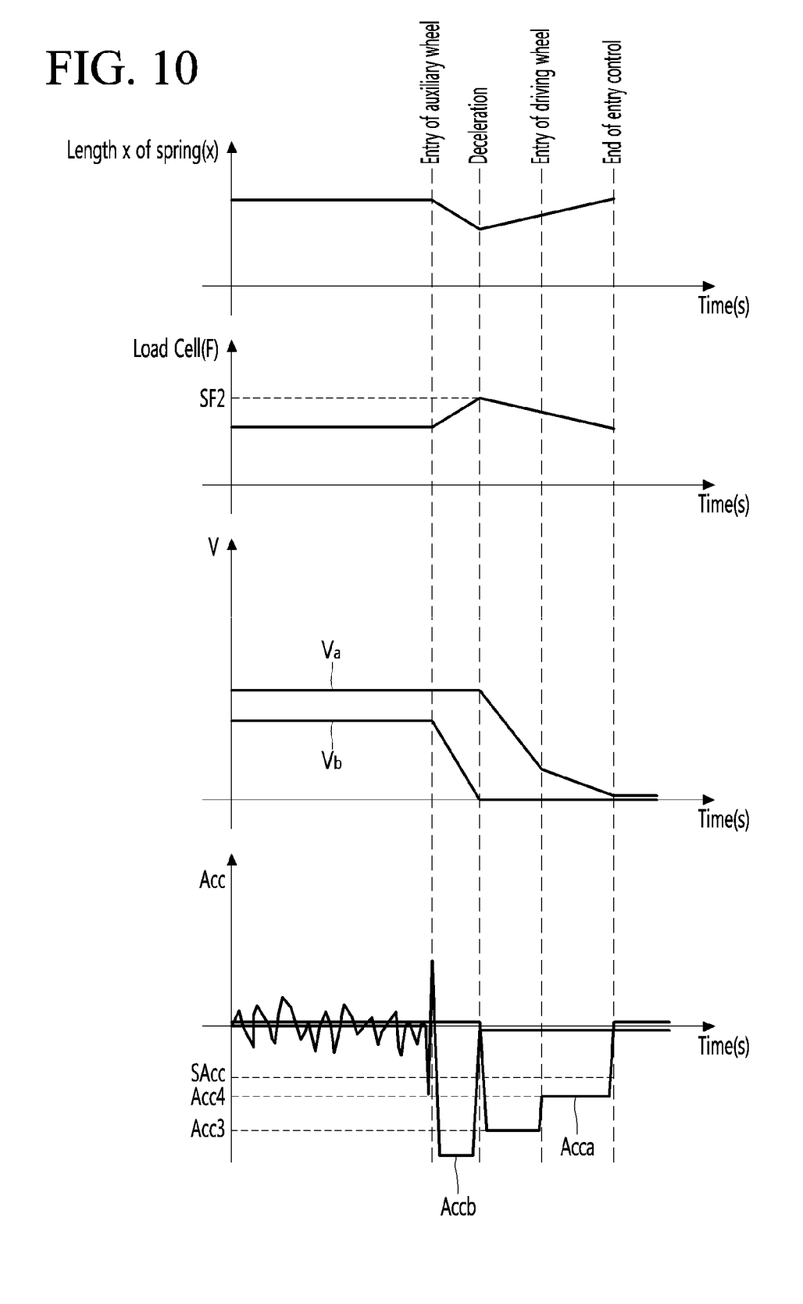
FIG. 10 is a view showing change in spring length, change in force measured by a load cell, change in movement speed of an auxiliary wheel, change in movement speed of a driving wheel, change in acceleration of the auxiliary wheel and change in acceleration of the driving wheel, when the movement speed of a moving walkway is less than the movement speed of a mobile robot according to an embodiment.

FIG. 10 is a view showing change in spring length, change in force measured by a load cell, change in movement speed of an auxiliary wheel, change in movement speed of a driving wheel, change in acceleration of the auxiliary wheel and change in acceleration of the driving wheel, when the movement speed of a moving walkway is less than the movement speed of a mobile robot according to an embodiment.

Acca shown in FIGS. 9 and 10 may be the acceleration of the driving wheel 201 and Accb may be the acceleration of the auxiliary wheel 210.

A method of controlling a robot system may control the robot in which the auxiliary wheel sensor 220 for sensing the movement speed of the auxiliary wheel 210 is installed in the mobile robot 200 provided with the driving wheel 201 and the driving motor 202.

The method of controlling the robot system may include a sensing step S1 in which the auxiliary wheel sensor 220 senses the movement speed Vb of the auxiliary wheel 210; and a speed changing step of accelerating or decelerating the driving motor 202.

The sensing step S1 may be performed when the mobile robot 200 travels, and the auxiliary wheel sensor 220 may sense and periodically transmit the movement speed Vb of the auxiliary wheel 210 to the controller 180.

The sensing step S1 may be performed while the mobile robot 200 travels along a traveling path passing through the moving walkway MW, and the speed changing step may start when the auxiliary wheel 210 enters the moving walkway MW (S2) during the sensing step S1.

When the mobile robot 200 enters the moving walkway MW, the auxiliary wheel 201 may be moved from the fixed body FA having a higher height to the moving body MB having a lower height.

While the auxiliary wheel 201 is moved from the fixed body FA to the moving body MB, the acceleration Accb of the auxiliary wheel 201 may instantaneously increase to a positive acceleration, and, when the auxiliary wheel 201 is seated on the moving body MB, the acceleration Accb of the auxiliary wheel 201 may be changed to the set negative acceleration SAcc or less and then increased to the set negative SAcc or more. When the decelerated auxiliary wheel 201 starts to move along the moving body MB moving at a constant speed, the acceleration of the auxiliary wheel 201 may become 0.

The acceleration Accb of the auxiliary wheel 201 being changed to the set negative acceleration SAcc or less and then increased to the set negative acceleration SAcc or more may be sensed according to change in force sensed by a force sensor F. When the change in force sensed by the force sensor F is equal to or greater than a set value, the controller 180 may determine that the auxiliary wheel 201 has entered the moving walkway MW (S2).

Upon determining that the auxiliary wheel 201 has entered the moving walkway MW, the controller 180 may perform the speed changing step.

The speed changing step may include acceleration steps S3, S4, S5, S6 and S7 of accelerating and then stopping the mobile robot 200.

The speed changing step may include deceleration steps S8, S9, S10, S11 and S12 of decelerating and then stopping the mobile robot 200.

The acceleration steps S3, S4, S5, S6 and S7 and the deceleration steps S8, S9, S10, S11 and S12 may be selectively performed while the robot 100a passes through the moving walkway MW.

The method of controlling the robot system may perform the acceleration steps S3, S4, S5, S6 and S7 or the deceleration steps S8, S9, S10, S11 and S12, when the auxiliary wheel 201 enters the moving walkway MW while the sensing step S1 is performed.

The acceleration steps S3, S4, S5, S6 and S7 may performed when the auxiliary wheel 201 enters the moving walkway MW and the moving speed Vb of the auxiliary wheel 201 is higher than the movement speed Va of the mobile robot 200.

The acceleration steps S3, S4, S5, S6 and S7 may include acceleration processes S3 and S4 in which the controller 180 accelerates the driving motor 202.

The acceleration processes S3 and S4 may start when the auxiliary wheel 201 enters the moving walkway MW and the moving speed Vb of the auxiliary wheel 210 is higher than the movement speed Va of the mobile robot 200 after entry of the auxiliary wheel 201, and the mobile robot 200 may be further accelerated as compared to before the auxiliary wheel 201 enters the moving walkway MW.

Referring to FIG. 9, when the movement speed Vb of the auxiliary wheel 201 is higher than the movement speed Va of the mobile robot 200 after the auxiliary wheel 201 enters the moving walkway MW, the length x of the spring 240 may gradually increase by the difference Vb−Va of the speeds of the auxiliary wheel 201 and the mobile robot 200 as time elapses, and pressure applied to the auxiliary wheel sensor 220 and, more particularly, the load cell 230 may gradually decrease.

The controller 180 may compare the movement speed Vb of the auxiliary wheel 201 sensed by the auxiliary wheel sensor 220 with the movement speed Va of the mobile robot 200 after the auxiliary wheel 201 enters the moving walkway MW, determine that the movement speed Vb of the auxiliary wheel 201 is higher than the movement speed Va of the mobile robot 200, and accelerate the driving motor 202 (S3 and S4).

The controller 180 may determine that the movement speed Vb of the auxiliary wheel 201 is higher than the movement speed Va of the mobile robot 200 when the pressure F applied to the load cell 230 is equal to or less than reference low pressure SF1 lower than pressure before the auxiliary wheel 210 enters the moving walkway MW by set pressure, after the auxiliary wheel 210 enters the moving walkway MW, and accelerate the driving motor 202 (S3 and S4).

During the acceleration processes S3 and S4, the controller 180 may accelerate the driving motor 202 at a positive first acceleration Acc1.

The acceleration processes S3 and S4 may be finished when the driving wheel 201 enters the moving walkway MW.

In the speed change step and, more particularly, the acceleration steps S3, S4, S5, S6 and S7, the driving motor 202 may be stopped when the driving wheel 201 enters the moving walkway MW after accelerating the driving motor 202.

In order to stop the driving motor 202 which has been accelerated, the acceleration steps S3, S4, S5, S6 and S7 may further include deceleration processes S5, S6 and S7 performed after the acceleration processes S3 and S4.

The deceleration processes S5, S6 and S7 may be performed when the driving wheel 201 enters the moving walkway MW (S5 and S6).

During the deceleration processes S5, S6 and S7, the controller 180 may decelerate the driving motor 202 at a negative second acceleration Acc2 and the driving motor 202 may be gradually decreased and then stopped (S6 and S7).

The deceleration processes S5, S6 and S7 may be finished (S7) when the speed of the driving motor 202 is 0, and the acceleration steps S3, S4, S5, S6 and S7 may be completed.

Meanwhile, the deceleration steps S8, S9, S10, S11 and S12 may be performed when the auxiliary wheel 201 enters the moving walkway MW and the movement speed Vb of the auxiliary wheel 201 is lower than the movement speed Va of the mobile robot 200.

The deceleration steps S8, S9, S10, S11 and S12 may include deceleration processes S8 and S9 in which the controller 180 decelerates the driving motor 202.

The deceleration processes S8 and S9 may be performed when the auxiliary wheel 201 enters the moving walkway MW and the movement speed Vb of the auxiliary wheel 201 is lower than the movement speed Va of the mobile robot 200 after entry of the auxiliary wheel 201, and the mobile robot 200 may further decrease as compared to before the auxiliary wheel 201 enters the moving walkway MW.

Referring to FIG. 10, when the movement speed Vb of the auxiliary wheel 201 is lower than the movement speed Va of the mobile robot 200 after the auxiliary wheel 201 enters the moving walkway MW, the length x of the spring 240 may be gradually decreased by the difference Va−Vb between the speeds of the mobile robot 200 and the auxiliary wheel 201, and pressure applied to the auxiliary wheel sensor 220 and, more particularly, the load cell 230 may be gradually increased.

The controller 180 may compare the movement speed Vb of the auxiliary wheel 201 sensed by the auxiliary wheel sensor 220 with the movement speed Va of the mobile robot 200 after the auxiliary wheel 201 enters the moving walkway MW, and decelerate the driving motor 202 when the movement speed Vb of the auxiliary wheel 201 is lower than the movement speed Va of the mobile robot 200 (S8 and S9).

The controller 180 may determine that the movement speed Vb of the auxiliary wheel 201 is lower than the movement speed Va of the mobile robot 200 when the pressure applied to the load cell 230 is equal to or greater than reference high pressure SF2 higher than pressure before the auxiliary wheel 210 enters the moving walkway MW by set pressure, after the auxiliary wheel 210 enters the moving walkway MW, and decelerate the driving motor 202 (S8 and S9).

During the deceleration processes S8 and S9, the controller 180 may decelerate the driving motor 202 at a negative third acceleration Acc2.

The deceleration processes S8 and S9 may be finished when the driving wheel 201 enters the moving walkway MW.

In the speed changing step and, more particularly, the deceleration steps S8, S9, S10, S11 and S12, the driving motor 202 may be stopped, when the driving wheel 201 enters the moving walkway MW after decelerating the driving motor 202.

In order to stop the driving motor 202 which has been accelerated, the deceleration steps S8, S9, S10, S11 and S12 may further include further deceleration processes S10, S11 and S12 performed the deceleration processes S8 and S9.

The further deceleration processes S10, S11 and S12 may be performed when the driving wheel 201 enters the moving walkway MW (S11 and S12).

During the further deceleration processes S10, S11 and S12, the controller 180 may decelerate the driving motor 202 at a negative fourth acceleration Acc4 and the driving motor 202 may be gradually decelerated and then stopped (S10 and S11).

The further deceleration processes S10, S11 and S12 may be finished (S12) when the speed of the driving motor 202 is 0, and the deceleration steps S8, S9, S10, S11 and S12 may be completed.

Meanwhile, the method of controlling the robot system may include constant speed steps S13, S14 and S15 of maintaining the driving motor 202 at a constant speed during the sensing step S1 in which the auxiliary wheel sensor 220 senses the movement speed Vb of the auxiliary wheel 210.

The constant speed steps S13, S14 and S15 may refer to steps of stopping the mobile robot after maintaining the movement speed Va of the mobile robot 200 at the same speed as before the auxiliary wheel 210 enters the moving walkway MW, after the auxiliary wheel 210 enters the moving walkway MW.

The constant speed steps S13, S14 and S15 may be performed when the auxiliary wheel 201 enters the moving walkway MW and the movement speed Vb of the auxiliary wheel 201 is equal or close to the movement speed Va of the mobile robot 200, and the constant speed steps S13, S14 and S15 may include a constant speed process in which the controller 180 maintains the current speed of the driving motor 202 at a constant speed.

During the constant speed process, the mobile robot 200 may move at the same speed as before the auxiliary wheel 201 enters the moving walkway MW.

After the auxiliary wheel 201 enters the moving walkway MW, when the movement speed Vb of the auxiliary wheel 201 is equal or close to the movement speed Va of the mobile robot 200, the length x of the spring 240 may be maintained in a set range, and pressure applied to the auxiliary wheel sensor 220 and, more particularly, the load cell 230 is not greatly changed and may be maintained in the set range.

The controller 180 may compare the movement speed Vb of the auxiliary wheel 201 sensed by the auxiliary wheel sensor 220 with the movement speed Va of the mobile robot 200 after the auxiliary wheel 201 enters the moving walkway MW, and may continuously drive the driving motor 202 at the current speed when the movement speed Vb of the auxiliary wheel 201 is equal or close to the movement speed Va of the mobile robot 200.

The controller 180 may determine that the movement speed Vb of the auxiliary wheel 201 is equal or close to the movement speed Va of the mobile robot 200 when the pressure F applied to the load cell 230 is maintained in a range between the reference high pressure SF2 and the reference low pressure SF1, after the auxiliary wheel 210 enters the moving walkway MW, and maintain the driving motor 202 at the constant speed without accelerate or decelerate the driving motor 202.

The constant speed processes may be finished when the driving wheel 201 enters the moving walkway MW.

In the constant speed processes S13, S14 and S15, the driving motor 202 may be stopped when the driving wheel 201 enters the moving walkway MW, after the driving motor 202 is maintained at the constant speed.

In order to stop the driving motor 202 which has been maintained at the constant speed, the constant speed processes S13, S14 and S15 may include deceleration processes S14 and S15 performed after the constant speed process. The deceleration processes S14 and S15 may be performed when the driving wheel 201 enters the moving walkway MW.

During deceleration processes S14 and S15, the deceleration processes may be performed when the speed of the driving motor 202 is 0, and the constant speed steps S13, S14 and S15 may be completed.

According to the embodiment, it is possible to sense change in movement speed of the auxiliary wheel with high reliability by a simple structure of a spring and a load cell.

In addition, since the auxiliary wheel and the load cell are connected by the spring, it is possible to minimize impact which may be generated when the auxiliary wheel enters the moving walkway from being transmitted to the mobile robot.

In addition, when the mobile robot enters the moving walkway, if the movement speed of the mobile robot is different from the movement speed of the moving walkway, the mobile robot may be accelerated or decelerated according to the movement speed of the moving walkway. Therefore, the driving wheel of the mobile robot can stably and smoothly enter the moving walkway, and overturning or shaking of the mobile robot can be minimized.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:
1. A robot system comprising:
 a mobile robot provided with a driving wheel and a driving motor;
 an auxiliary wheel;
 an auxiliary wheel sensor installed in the mobile robot and connected with the auxiliary wheel to sense a movement speed of the auxiliary wheel; and
 a controller configured to:
 accelerate the driving motor if the movement speed of the auxiliary wheel is higher than a movement speed of the mobile robot after the auxiliary wheel enters a moving walkway, and decelerate the driving motor if the movement speed of the auxiliary wheel is lower than the movement speed of the mobile robot after the auxiliary wheel enters the moving walkway.

2. The robot system of claim 1,
wherein the auxiliary wheel sensor includes:
a load cell provided in the mobile robot; and
a spring connected to the load cell and the auxiliary wheel,
wherein the controller changes a speed of the driving motor according to a sensing value of the load cell.

3. The robot system of claim 2, further comprising a cylinder connected to the mobile robot and having formed therein a space in which the spring is received.

4. The robot system of claim 3, wherein the cylinder is provided to protrude from a bottom of the mobile robot.

5. The robot system of claim 2,
wherein the auxiliary wheel includes:
a wheel, and
a wheel connector, to which the wheel is rotatably connected, and
wherein a space in which a portion of the spring is received is formed in the wheel connector.

6. The robot system of claim 2, further comprising a cylinder connected to the mobile robot,
wherein the auxiliary wheel includes:
a wheel, and
a wheel connector, to which the wheel is rotatably connected, a portion of the wheel connector being inserted into the cylinder or a portion of the cylinder being inserted into the wheel connector, and
wherein spaces in which the spring is received are formed in the cylinder and the wheel connector, respectively.

7. The robot system of claim 2,
wherein the controller accelerates the driving motor if a length of the spring increases, and
wherein the controller decelerates the driving motor if the driving wheel enters a moving walkway.

8. The robot system of claim 2, wherein the controller decelerates the driving motor if a length of the spring decreases.

9. The robot system of claim 2,
wherein the controller decelerates the driving motor at a first acceleration if a length of the spring decreases and decelerates the driving motor at a second acceleration if the driving wheel enters a moving walkway, and
wherein the second acceleration is less than the first acceleration.

10. A method of controlling a robot system including a mobile robot provided with a driving wheel and a driving motor, the method comprising:
sensing a movement speed of an auxiliary wheel by an auxiliary wheel sensor installed in the mobile robot;
performing a speed changing process of accelerating the driving motor if a movement speed of the auxiliary wheel is higher than a movement speed of the mobile robot after the auxiliary wheel enters a moving walkway and decelerating the driving motor if the movement speed of the auxiliary wheel is lower than the movement speed of the mobile robot after the auxiliary wheel enters the moving walkway.

11. The method of claim 10, wherein the performing of the speed changing process includes stopping the driving motor if the driving wheel enters the moving walkway after accelerating the driving motor.

12. The method of claim 10, wherein the performing of the speed changing process includes stopping the driving motor if the driving wheel enters the moving walkway after decelerating the driving motor.

* * * * *